United States Patent Office

2,844,598
Patented July 22, 1958

2,844,598

DISPERSE DYESTUFFS OF THE ANTHRA-
QUINONE SERIES

Jacques Günthard, Basel, Switzerland, assignor to Sandoz
A. G., Basel, Switzerland, a Swiss firm No Drawing. Application December 21, 1956
Serial No. 629,779

Claims priority, application Switzerland
December 30, 1955

5 Claims. (Cl. 260—380)

The present invention relates to a process for the production of disperse dyestuffs of the anthraquinone series corresponding to the general formula

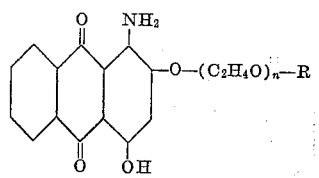

(I)

wherein $n$ stands for 2 or 3, and R for an alkyl radical containing 1 to 6, preferably 1 or 2, carbon atoms.

The new anthraquinone disperse dyestuffs are eminently suitable for the dyeing and printing of cellulose ester, cellulose ether, polyamide, polyacrylonitrile and linear aromatic polyester fibers, on which they give brilliant, level and fast-to-light red shades.

The process for the production of the disperse dyestuffs of the anthraquinone series consists in reacting 1 mol of an alkali-metal salt of the 1-amino-4-hydroxyanthraquinone-2-sulfonic acid with 1 mol of a di- or triethyleneglycolmonoalkylether in the presence of at least 2 mols of an alkali-metal hydroxide.

The reaction is conducted preferably in a substantial excess of the above-defined glycol ether, which is thus both a reaction component and a solvent. It is advantageous to work in a water-free medium in order to preclude the formation of undesirable by-products. The choice of a temperature between 100° and 200° C. for example 115–160° C., ensures that the reaction proceeds at a uniform and rapid rate, since under these conditions the water can be completely removed from the reaction mixture before and during the reaction. Alkali-metal hydroxides which are especially noteworthy for the present purpose are sodium hydroxide and potassium hydroxide. In order to isolate the reaction product the excess alkali-metal hydroxide is neutralized with a suitable acid, the solvent removed, e. g. by distilling in vacuo, and the distillation residue suspended in water, or the reaction mass run into ample water and the alkaline dyestuff suspension neutralized. The resulting water-insoluble product is filtered off, washed with water and dried.

The following examples illustrate the invention. All parts and percentages specified therein are by weight; temperatures are given in degrees centigrade.

EXAMPLE 1

3.4 parts of potassium hydroxide are dissolved in 150 parts of diethylene glycolmonomethyl ether. The water thus formed is removed from the solution by a slow current of gas at 120°. Then 10.2 parts of sodium 1-amino-4-hydroxyanthraquinone-2-sulfoante are run into the vigorously stirred solution and the mass maintained at 110–115° until a sample has been found insoluble in cold acidified water.

The reaction mass is allowed to cool to 100° and is then poured into 400 parts of water. After the excess potassium hydroxide has been neutralized with 4 parts of 100% acetic acid, the dyestuff suspension is filtered off at room temperature, the filtration residue being subsequently washed with cold water and dried.

The 1-amino-2-(methoxy)-ethoxyethoxy-4-hydroxyanthraquinone is obtained as a red powder which dissolves in solvents such as alcohol and benzene with a scarlet coloration, in pyridine with a violetish red coloration and in concentration sulfuric acid with a yellow coloration. The latter solution changes yellow to violet upon the addition of formaldehyde.

The new dyestuff can be readily converted into powder form, for example by grinding it in aqueous dispersion in presence of the condensation product of naphthalene sulfonic acid and formaldehyde to give a paste which is spray dried. This dyestuff powder is easily dispersed in water and dyes cellulose acetate in brilliant red shades of excellent fastness to light. The red dyeings on linear aromatic polyester fibers are notable for their outstanding fastness to light, washing and ironing.

The new dyestuff is also suitable for dyeing cellulose triacetate, synthetic polyamide and polyacrylonitrile fibers.

A specimen dyeing procedure is as follows: 2 parts of the dyestuff obtained as described in the present example are dispersed in 100 parts of a 1% aqueous soap solution, and 5 parts of the dispersion are stirred into 250 parts of a 0.5% aqueous solution of Marseilles soap. Into the prepared dyebath at 30° are entered 2.5 parts of cellulose acetate, the temperature of the bath then being raised to 80° in the course of 30 minutes. The material is dyed at this temperature for 1 to 1½ hours. After this time it is removed, rinsed with water and dried. The cellulose acetate is dyed in a brilliant red to scarlet hue of very good light fastness.

EXAMPLE 2

A solution of 3.4 parts of potassium hydroxide in 50 parts of diethylene glycol monohexyl ether is dehydrated by the introduction of a current of dry nitrogen at 120°. 10.2 parts of sodium 1-amino-4-hydroxyanthraquinone-2-sulfonate are run into the solution and the mixture heated to 180°. This temperature is maintained until no sodium 1-amino-4-hydroxyanthraquinone-2-sulfonate is indicated in a sample, which is the case after 12 to 15 hours. The reaction mass is cooled to 100°, neutralized with 4 parts of acetic acid 100% and the excess diethyleneglycolmonohexylether distilled from it under reduced pressure.

The distillation residue is dispersed in water, stirred for some time to dissolve the by-products of the reaction, and then suctioned off and dried.

The resulting 1-amino-2-(n-hexyloxy)-ethoxyethoxy-4-hydroxyanthraquinone is a red-brown powder which dissolves in organic solvents with a red coloration and in concentrated sulfuric acid with a yellow coloration. The latter changes color to violet on the addition of formaldehyde. The new dyestuff dyes cellulose acetate from aqueous dispersion in brilliant red shades of excellent light fastness, and polyester fibers in red shades of very good fastness to light, washing and ironing. It also yields very fast red dyeings on cellulose triacetate and synthetic polyamide fibers.

Polyester fibers can be dyed in the following way:

100 parts of polyester fiber are entered into a dyebath at 60° composed of 3000 parts of water, 2 parts of the dyestuff obtainable according to the present example and 1.5 parts of 2-hydroxy-1.1'-diphenyl. The dyebath is heated to the boil in the course of 20 minutes. The material is dyed for 60 minutes at 100°, then removed from the bath, rinsed with water and dried. The polyester fiber is dyed in an attractive red shade of very good fastness to light, washing and ironing.

EXAMPLE 3

10.2 parts of sodium 1-amino-4-hydroxyanthraquinone-2-sulfonate are entered into a dehydrated solution of 2.6 parts of sodium hydroxide and 100 parts of triethyleneglycolmonomethylether. The mixture is heated to 160° and held at this temperature until the starting material has completely reacted. The reaction takes about 15 hours. The reaction mass is allowed to cool to 100°, neutralized with 4 parts of 100% acetic acid, and the excess triethyleneglycol monomethylether distilled under reduced pressure.

The distillation residue is added to a solution of 12 parts of the condensation product of naphthalene sulfonic acid and formaldehyde and 100 parts of water. The suspension is heated for 1 hour at the boil, then sieved, finely ground in a ball mill and dried in a spray dryer. The 1 - amino - 2 - (methoxy)ethoxyethoxyethoxy - 4-hydroxyanthraquinone is obtained as a dyestuff powder ready for use. It dyes cellulose acetate in brilliant red shades fast to light and washing.

Fabrics of cellulose acetate, triacetate and polyester fibers are printed in the following way:

50 parts of the above described dyestuff,
25 parts of diethyleneglycolmonobutylether,
25 parts of sodium dinaphthylmethane-disulfonate,
500 parts of crystal gum 1:2 and
400 parts of water
_____
1000 parts are compounded to give a printed paste which is printed on a fabric of polyester fiber. The print is dried at 50°, steamed for 10 minutes at normal pressure (temperature 100–105°) and then for 30 minutes at 1.7 atmospheres pressure (temperature about 115°), rinsed with cold water, soaped at 50° with a sulfonated fatty alcohol, rinsed again and finally dried. A level red print of good fastness to light, washing and ironing is obtained.

Cellulose triacetate is printed and steamed in the same way, while for cellulose acetate 30 minutes' steaming at 100° is sufficient.

In the following table further disperse dyestuffs of the anthraquinone series are enumerated. They correspond to the formula

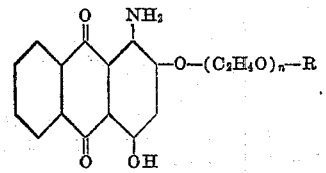

They can be produced by the processes described in Examples 1 to 3 and dye cellulose acetate, cellulose triacetate, linear aromatic polyester, polyamide and polyacrylonitrile fibers in very fast, brilliant red shades.

Table

| Example No. | R | $n$ | Shade of Dyeings on Cellulose Acetate and Polyester Fibers |
|---|---|---|---|
| 4 | —$C_2H_5$ | 2 | red. |
| 5 | —$C_4H_9$ | 2 | red. |
| 6 | —$C_2H_5$ | 3 | red. |

Formulae of representative dyestuffs of the foregoing examples are as follows:

Example 1:

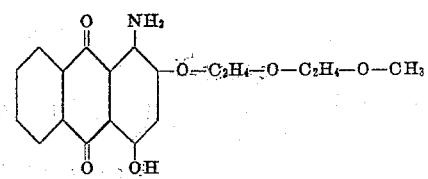

Example 2:

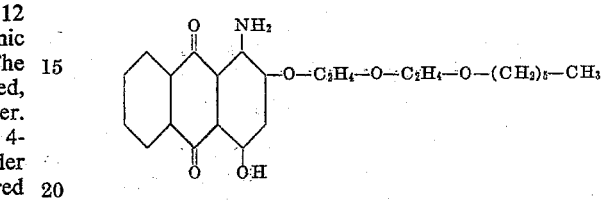

Example 3:

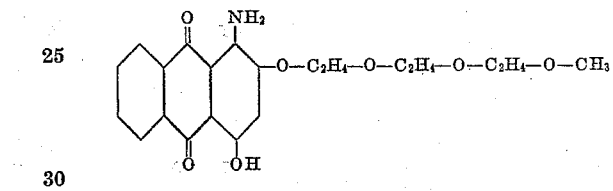

Example 4:

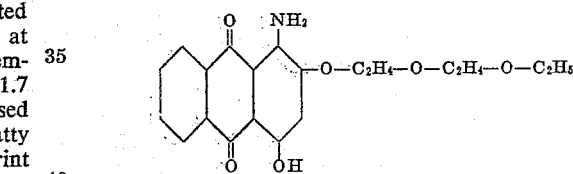

Example 6:

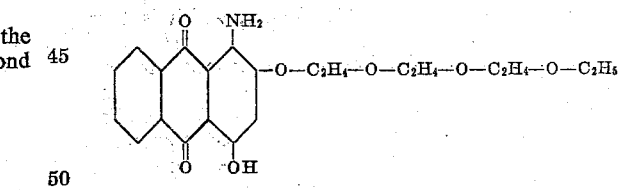

Having thus disclosed the invention what is claimed is:
1. A disperse dyestuff of the anthraquinone series which corresponds to the formula

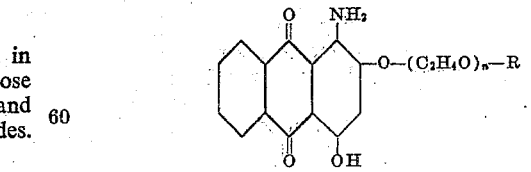

wherein $n$ is one of the integers 2 and 3, and R represents an alkyl radical containing 1 to 6 carbon atoms.

2. The disperse dyestuff of the anthraquinone series which corresponds to the formula

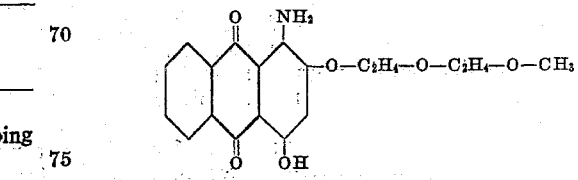

3. The disperse dyestuff of the anthraquinone series which corresponds to the formula

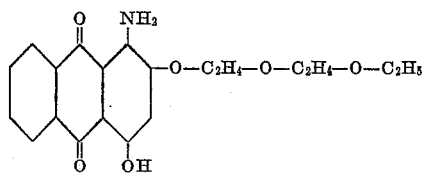

4. The disperse dyestuff of the anthraquinone series which corresponds to the formula

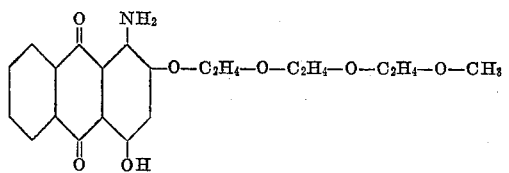

5. The disperse dyestuff of the anthraquinone series which corresponds to the formula

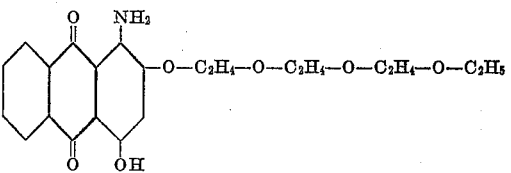

References Cited in the file of this patent

UNITED STATES PATENTS

| | | |
|---|---|---|
| 2,726,251 | Dickey et al. | Dec. 6, 1955 |
| 2,768,052 | Johnson | Oct. 23, 1956 |

FOREIGN PATENTS

| | | |
|---|---|---|
| 244,462 | Great Britain | May 9, 1927 |